2,830,098
1,1,1,2,3-PENTACHLORO-4,4,4-TRIFLUORO-BUTENE-2

Charles F. Baranauckas and William E. Ashton, Niagara Falls, N. Y., assignors to Hooker Electrochemical Company, Niagara Falls, N. Y., a corporation of New York No Drawing. Application June 17, 1955
Serial No. 516,303

2 Claims. (Cl. 260—653)

This invention relates to a new chemical compound containing carbon, chlorine and fluorine, i. e. to a perhalocarbon having the empirical formula $C_4Cl_5F_3$. More particularly, this invention relates to the new chemical compound 1,1,1,2,3-pentachloro-4,4,4-trifluorobutene-2.

The compound of this invention may be prepared by an exchange of halogen atoms between an organic fluoride and an inorganic chloride. More particularly, the compound of this invention may be prepared by an exchange of fluorine atoms with chlorine atoms between the organic fluoride, 2,3-dichloro-1,1,1,4,4,4-hexafluorobutene-2 and an inorganic chloride, such as aluminum chloride, at a moderate temperature, with or without a solvent, presumably in accordance with the following equation:

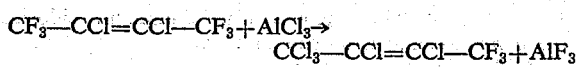

The preparation of the starting material, 2,3-dichloro-1,1,1,4,4,4-hexafluorobutene-2, is disclosed and claimed in United States Patent 2,436,357.

A solvent may or may not be employed in the preparation of the compound of this invention. If a solvent is used, it should be inert with respect to the reactants and reaction products; also, its boiling point should be high enough to allow for sufficiently rapid reaction at elevated temperatures. Among the solvents which may be employed are hexachlorobutadiene, perfluorocyclohexane, cyclohexane, etc.

We have found that the control of the reaction temperature is critical because the reaction is exothermic and excessive heat may accumulate, thereby resulting in the formation of undesirable by-products. One way of controlling the exothermic reaction is to add the inorganic chloride, such as aluminum chloride, in small portions over an extended period of time. Another way to control the exothermic reaction is to effect the reaction in the presence of a solvent or diluent, whereby the inorganic chloride addition need not be made in small portions.

The compound of this invention is useful as a chemical intermediate, for example, 1,1,1,2,3-pentachloro-4,4,4-trifluorobutene-2 may be reacted with concentrated sulfuric acid at temperatures of about 130 degrees centigrade, to produce $\alpha,\beta$-dichloro-$\gamma,\gamma,\gamma$-trifluorocrotonic acid as exemplified hereinafter. The $\alpha,\beta$-dichloro-$\gamma,\gamma,\gamma$-trifluorocrotonic acid and its derivatives are prepared as exemplified hereinafter and are disclosed and claimed in our copending application Serial No. 516,304 filed of even date herewith.

The following examples illustrate the preparation and utility of the compound of this invention; however, they are not to be construed as limiting except as defined in the appended claims.

*Example 1.—Preparation of 1,1,1,2,3-pentachloro-4,4,4-trifluorobutene-2*

One thousand three hundred ninety-eight grams (6 moles) of 2,3-dichloro-1,1,1,4,4,4-hexafluorobutene-2, prepared in a manner after that described in 2,436,357 and have a boiling point of 66 to 67 degrees centigrade, was charged into a three liter three-necked flask, equipped with a reflux condenser, heating and/or cooling means, and an agitator. The charge was heated to a temperature of approximately 60 degrees centigrade, then 933 grams (7 moles) of anhydrous aluminum chloride was added in 50 gram portions over a time period of approximately 9 hours. After all of the aluminum chloride was charged, the temperature of the reaction mixture reached approximately 95 degrees centigrade. At this stage, the reaction mixture was agitated and refluxed for an additional 3 hours, whereupon a maximum reaction temperature of about 106 degrees centigrade was attained.

As the reaction progressed, the color of the aluminum chloride-chlorofluorocarbon mixture changed from white to yellow and finally to a brownish-green color. The refluxing was stopped at this point. After cooling to room temperature, the contents of the reaction flask were filtered under suction while the filter flask was immersed in an ice-bath. The resultant precipitate which consisted of aluminum fluoride, unreacted aluminum chloride and an aluminum chlorofluoro complex was decomposed by slurrying in cold dilute hydrochloric acid whereupon a two-layer solution was produced. Steam distillation of the bottom layer gave additional organic material which after washing with dilute hydrochloric acid was combined with the original filtrate. The organic materials were combined and then washed twice with water and dried. Fractionation of the material gave 882 grams of a material possessing a boiling point range of between about 176 and about 181 degrees centigrade. This material was analyzed and found to possess a chlorine content of 63.4 percent by weight and a molecular weight of 278, which corresponds to 1,1,1,2,3-pentachloro-4,4,4-trifluorobutene-2 having a theoretical chlorine content of 62.9 percent by weight and a theoretical molecular weight of 282.

*Example 2.—Utility as a chemical intermediate*

A mixture of 1,412 grams (5 moles) of 1,1,1,2,3-pentachloro-4,4,4-trifluorobutene-2, prepared as in Example 1, and 1,567 grams (16 moles) of concentrated sulfuric acid was charged to a three liter, three-necked flask equipped with agitator, heating mantle, reflux condenser and thermometer. The charge was agitated and gradually heated to a temperature of about 130 degrees centigrade, at which point the reaction mixture temperature was held constant for a period of about 10 hours, during which time hydrogen chloride was evolved. The reaction mixture was then cooled to room temperature after which the drop-wise addition of 500 milliliters of cold water was effected, resulting in further evolution of additional hydrogen chloride. At this point, the reaction mixture contained two liquid phases, an aqueous lower layer and an organic upper layer. The organic material was separated from the bottom layer, washed once with cold water and neutralized with 10 percent sodium hydroxide solution. The neutralization effected the solution of the product $\alpha,\beta$-dichloro-$\gamma,\gamma,\gamma$-trifluorocrotonic acid, and left insoluble, unreacted halocarbon which was separated from the alkaline solution. Acidification of the alkaline solution of the haloacid with a large excess of concentrated hydrochloric acid, produced a mixture of two liquid phases. The lower layer containing α,β-dichloro-γ,γ,γ-trifluorocrotonic acid was taken up in 200 milliliters of diethyl-ether and was washed with three 150 milliliter portions of cold water to remove any dissolved hydrogen chloride. After drying, the ether and any low boiling materials were removed by fractionation at atmospheric pressure up to a body temperature of 100 degrees centigrade. The fractionation was continued under a pressure of 11 millimeters mercury to yield 780 grams of a material possessing a boiling point range of 83 to 85 degrees centigrade.

Ether extraction of the sulfuric acid layer from the reaction mixture resulted in the recovery of an additional 81.4 grams of material. This material was analyzed and found to possess a chlorine content of 33.94 and 33.54 percent by weight, which corresponds to α,β-dichloro-γ,γ,γ-trifluorocrotonic acid possessing a theoretical chlorine content of 33.94 percent. A total of 861 grams of acid was obtained which represents a theoretical yield of 82.4 percent.

*Example 3.—Preparation of α,β-dichlorotrifluorocrotonyl chloride*

A one liter three-necked flask equipped with an agitator, a dropping funnel, a condenser and a heating and/or cooling means, was charged with 313.5 grams (1.5 moles) of α,β-dichloro-γ,γ,γ-trifluorocrotonic acid. The reaction flask was heated to 135 degrees centigrade, then 391 grams (2.0 moles) of benzotrichloride was added over an elapsed time of one and one-half hours. As the product α,β-dichloro-γ,γ,γ-trifluorocrotonyl chloride was formed, it was slowly removed by continuous distillation through the air condenser. During the reaction, by-product hydrogen chloride was evolved. The temperature of the reaction mixture was gradually increased to 170 degrees centigrade and held constant for one-half hour. The crude product was fractionated to yield 281 grams of material (82.3 percent yield by weight) possessing a boiling point range of 113 to 115 degrees centigrade. Analysis of this material gave a chlorine content of 46.59 and 46.74 percent by weight which corresponds to α,β-dichloro-γ,γ,γ-trifluorocrotonyl chloride possessing a theoretical chlorine content of 46.7 percent by weight.

*Example 4.—Preparation of ethyl ester of α,β-dichloro-γ,γ,γ-trifluorocrotonic acid*

A total of 11.4 grams (0.05 mole) of dichlorotrifluorocrotonyl chloride was charged to a 250 milliliter three-necked flask, equipped with a stirrer, a reflux condenser and a dropping funnel. Addition of 46 grams (1 mole) of ethyl alcohol caused the temperature to rise above room temperature, whereupon external heat was applied to raise the temperature to about 78 degrees centigrade. The reaction mixture was cooled and poured into cool water. The resulting crude ester was dried and then distilled at 743 millimeters' pressure; 9 grams of the ethyl dichlorotrifluorocrotonate was recovered.

The α,β-dichloro-γ,γ,γ-trifluorocrotonic acid and its ethyl ester are particularly useful for the elimination of internal parasites from the alimentary tract of animals, i. e., they are anthelmintic agents. For example, when an anthelmintic feed composition containing α,β-dichloro-γ,γ,γ-trifluorocrotonic acid as its only active ingredient, in proportions such that an adequate dose is obtained by poultry consuming the material placed in their food, such as between one-tenth and ten percent by weight of mash, it is found that parasites, particularly round worms of the Ascaridae family, are effectively eliminated from the poultry consuming such specially prepared food. Likewise, similar results are obtained by employing the ethyl ester of α,β-dichloro-γ,γ,γ-trifluorocrotonic acid, instead of the acid itself.

It is to be understood that the invention is not limited to the specific examples which have been offered merely as illustrative and that modifications may be made within the scope of the appended claims without departing from the spirit of the invention.

We claim:

1. 1,1,1,2,3-pentachloro-4,4,4-trifluorobutene-2.
2. The process for preparing 1,1,1,2,3-pentachloro-4,4,4-trifluorobutene-2 which comprises reacting 2,3-dichloro-1,1,1,4,4,4-hexafluorobutene-2 with aluminum chloride while maintaining a maximum reaction temperature of about 106 degrees centigrade.

References Cited in the file of this patent

UNITED STATES PATENTS 2,436,357    Gochenour et al. _____ Feb. 17, 1948

OTHER REFERENCES

Henne et al.: J. A. C. S., vol. 60, pp. 1697–8.